Oct. 28, 1947. D. G. ROOS 2,429,732
SYSTEM AND APPARATUS FOR OPERATING SUBMERGED
INTERNAL-COMBUSTION ENGINES
Filed Jan. 4, 1945 3 Sheets—Sheet 1
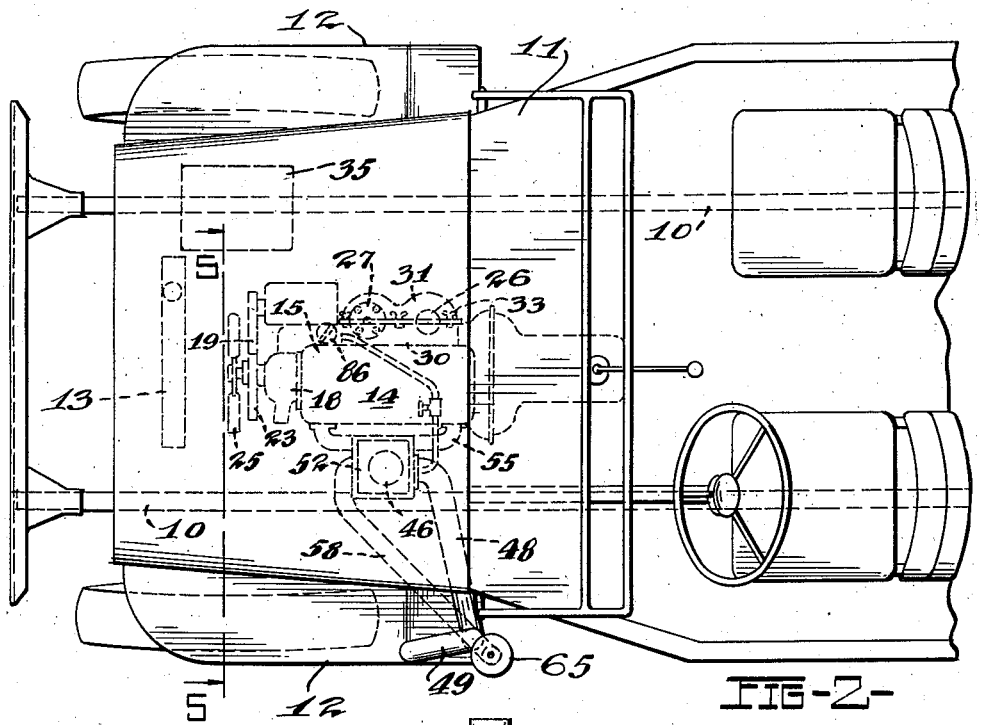
FIG-2-
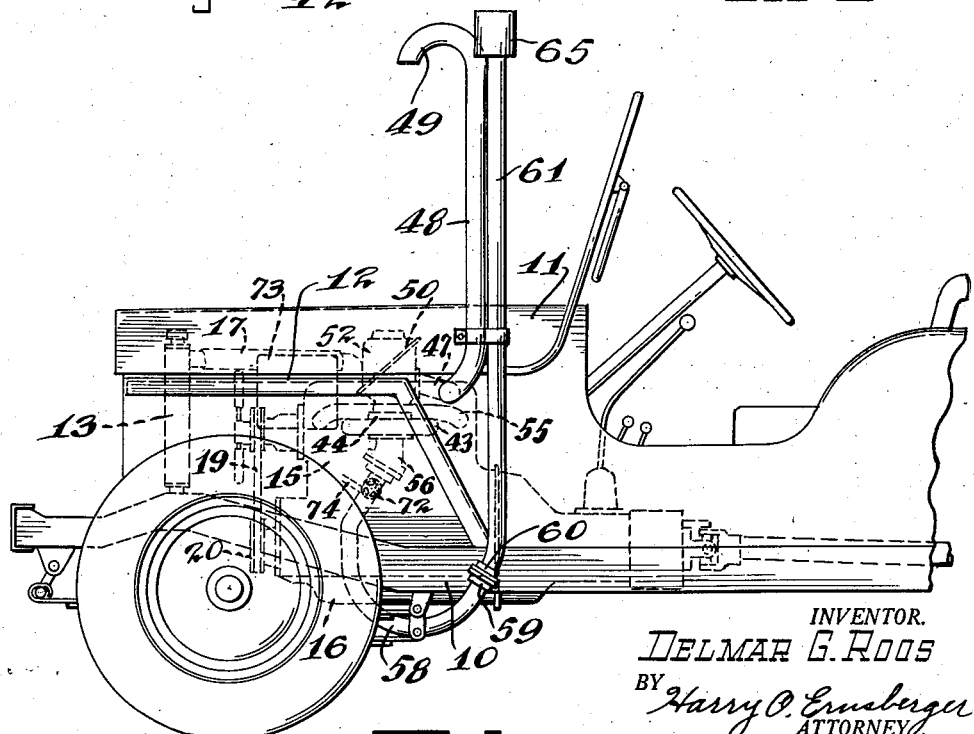
FIG-1-
INVENTOR.
DELMAR G. ROOS
BY Harry O. Ernsberger
ATTORNEY.

Oct. 28, 1947. D. G. ROOS 2,429,732
SYSTEM AND APPARATUS FOR OPERATING SUBMERGED
INTERNAL-COMBUSTION ENGINES
Filed Jan. 4, 1945 3 Sheets-Sheet 2
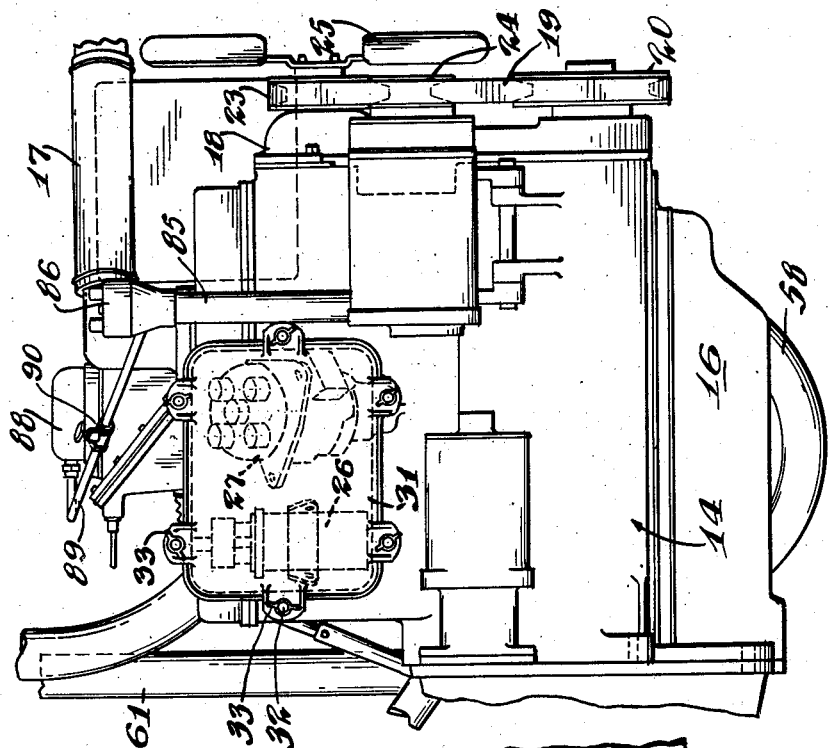
FIG-4-
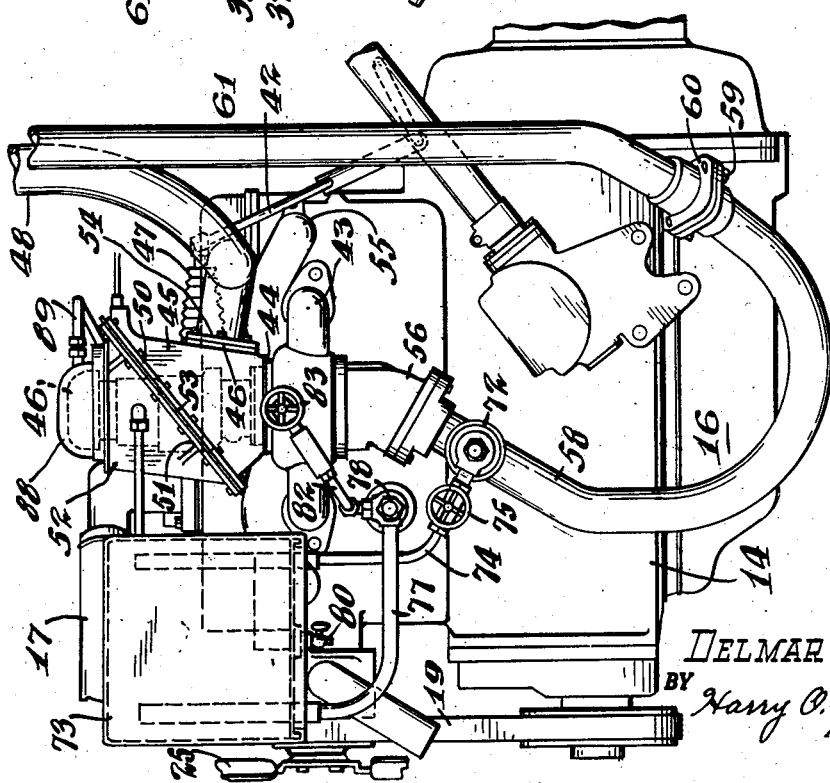
FIG-3-
INVENTOR.
DELMAR G. ROOS
BY Harry O. Ernsberger
ATTORNEY.

Oct. 28, 1947.   D. G. ROOS   2,429,732
SYSTEM AND APPARATUS FOR OPERATING SUBMERGED
INTERNAL-COMBUSTION ENGINES
Filed Jan. 4, 1945   3 Sheets-Sheet 3
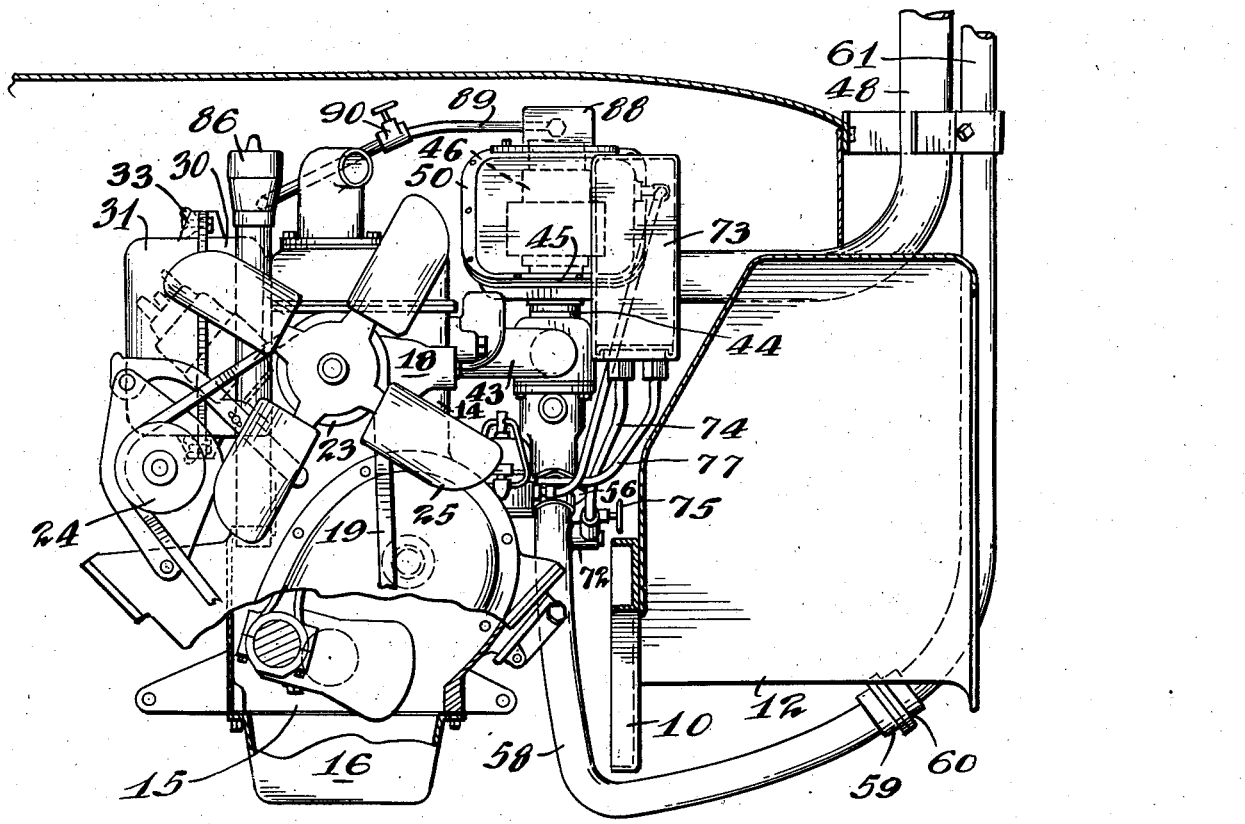
FIG-5-
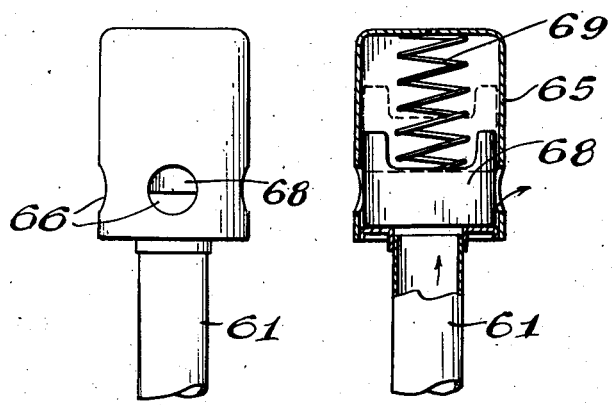
FIG-6-   FIG-7-
INVENTOR.
DELMAR G. ROOS
BY Harry O. Ernsberger
ATTORNEY.

Patented Oct. 28, 1947

2,429,732

UNITED STATES PATENT OFFICE 2,429,732

SYSTEM AND APPARATUS FOR OPERATING SUBMERGED INTERNAL - COMBUSTION ENGINES

Delmar G. Roos, Toledo, Ohio, assignor to Willys-Overland Motors, Inc., Toledo, Ohio, a corporation of Delaware Application January 4, 1945, Serial No. 571,284

17 Claims. (Cl. 123—1)

1

This invention relates to system and apparatus associated with an internal combustion engine of an automotive vehicle of such a nature as to render the engine capable of operation while immersed or submerged in water.

The invention embraces the system and apparatus for subjecting the interior of an engine crankcase to a gas pressure greater than atmospheric pressure for the purpose of preventing or minimizing the ingress of water into the engine crankcase during the submersion of the engine which might otherwise seep in through the crankshaft journal bearing clearances, interstices formed by faulty gaskets and other places difficult of obtaining a water tight seal.

One of the objects of the invention is the provision of an arrangement wherein exhaust gases from the engine are biased into the interior of the engine crankcase under the influence of pressure regulating means to predetermine a uniform gas pressure in the crankcase when the engine is submerged.

Another object resides in apparatus or closures for various adjuncts used with the engine, the closures being suitably sealed to prevent water coming in contact with such adjuncts.

Another object resides in the provision of exhaust system for an engine where a portion of exhaust gases therefrom are biased into the interior of the engine crankcase to set up a super atmospheric pressure therein in combination with means interposed in an exhaust conduit to condense moisture or water vapor out of the exhaust gases before the latter are introduced into the crankcase.

A further object is the provision of apparatus in conjunction with an internal combustion engine whereby under normal operation the engine crankcase is ventilated by fresh air, the apparatus being so arranged that the ventilating system may be quickly discontinued and a fluid pressure built up within the engine crankcase to render the engine adaptable for operation when submerged in water.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view showing

2 the forward portion of a vehicle illustrating the apparatus of my invention in conjunction with the vehicle engine;

Figure 2 is a top plan view of the arrangement illustrated in Figure 1;

Figure 3 is a side elevational view of the engine, illustrating a form of apparatus for enclosing and venting the carburetor and the arrangement biasing exhaust gases into the engine crankcase;

Figure 4 is a view of the opposite side of the engine particularly showing the arrangement of waterproofing the ignition apparatus;

Figure 5 is the front elevational view of the engine taken substantially on the line 5—5 of Figure 2 and illustrating the apparatus for biasing exhaust gases into the engine crankcase;

Figure 6 is an elevational view of a portion of the exhaust pipe for the engine illustrating a means for maintaining a predetermined amount of exhaust pressure in the exhaust system;

Figure 7 is a vertical sectional view illustrating the pressure regulating means shown in Figure 6.

The system and apparatus of my invention is especially adaptable for incorporation in a vehicle used or useable for military operations, but it is to be understood that I contemplate the use of the system and apparatus of the invention with any engine or mechanism where it is desired to operate the same when submerged in water or other fluid.

Referring to the drawings in detail, I have illustrated the arrangement of my invention associated with an engine of a military vehicle wherein numeral 10 designates the vehicle frame, 11 the cowl portion, 12 the front fenders and a cooling radiator 13. The engine 14 illustrated is of the four cylinder reciprocating piston type having a crank chamber 15 closed by a crankcase 16, the engine head being connected to the cooling radiator 13 by means of a tube 17. A water pump (not shown) is contained in a housing 18 mounted at the forward end of the engine, the water pump being driven by means of a belt 19 engaging a drive pulley 20 secured to the extremity of the crank shaft. The belt 19 engages the pulley 23 on the water pump shaft and another pulley 24 associated with the generator so that one belt drives the generator, the water pump and a cooling fan 25 carried on the end of the water pump shaft.

As shown in Figures 1 and 3 a two part housing made up of members 30 and 31 serve to enclose the ignition coil 26 and the ignition distributor 27. The housing portion 30 is fixedly secured to the engine bloc, while the other housing portion 31 is secured to housing portion 30 by means of bolts 32 and wing nuts 33, there being a gasket between the juxtaposed portions of the housing elements 30 and 31. The coil 26 is connected to a storage battery 35 by suitable means (not shown). The distributor 27 disposed within the two part housing is connected by suitable waterproof cables or connectors (not shown) to the spark plugs. In this manner the ignition system of the engine is adequately waterproofed so that it will function even though it is completely immersed in water.

Secured to one side of the engine bloc is an intake manifold 43 formed with a flanged portion 44 upon which is disposed a lower half or element 45 of an enclosure or housing for the carburetor 46. The housing element 45 is configurated with a diagonally disposed flange 50 which is adapted to mate with a similarly shaped flange 51 formed on the upper housing element 52 which, with element 45 completely encloses carburetor 46 and its associated mechanism. A gasket 53 is interposed between the juxtaposed flanges 50 and 51 to form a water tight joint between the housing portions 45 and 52. The throttle linkage 42 is operatively connected with the carburetor 46 and a bellows-like member 47 serves to seal the passage of the throttle connection through the housing element 45.

The housing portion 45 is formed to receive flanged extremity 54 of an air intake pipe 48 which extends upwardly and terminates in a semi-circular loop 49 as particularly shown in Figure 1. Thus when the vehicle is submerged, the inlet opening of pipe 48 at the loop 49 will be above water level, the loop 49 preventing rain, snow or the like entering the air intake. Positioned adjacent the intake manifold 43 is an exhaust manifold 55 having a depending outlet 56 to which is connected an exhaust pipe 58. Exhaust pipe or tube 58 passes downwardly and outwardly beneath a portion of frame 10 and is provided with a flanged fitting 59 which mates with a similarly shaped fitting 60 formed on the lower end of an upwardly projecting extension 61 of the exhaust pipe 58.

The arrangement is inclusive of means for setting up and regulating back pressure in the exhaust system of the engine for a purpose to be hereinafter explained. This means is inclusive of a cylindrically shaped housing 65 formed at the lower portion of its perimeter with a plurality of openings 66. Reciprocably mounted within the cylinder 65 is a plunger or weight 68 which is normally disposed in the lower portion of the cylinder as shown in Figure 7 and functions as a valve to close the openings 66. A comparatively weak expensive spring 69 is positioned between the upper end wall of cylinder 65 and the plunger 68. When the engine is in operation and exhaust gases are passing through tubes 58 and 61, a back pressure is built up in the system because of the weight 68. When the back pressure exceeds the downwardly acting pressure of the weight 68, the pressure functions to elevate the weight or valve 68 so as to permit exhaust gases to escape into the atmosphere through the openings 66. As the exhaust gases are subject to the successive impulses of discharged gases from the cylinders of the engine, the spring 69 serves to dampen or minimize fluttering of the valve or weight 68 under the influence of the pulsations in the exhaust system.

In order to prevent or minimize the ingress of water into the crank chamber and crankcase when the engine is in submerged condition, my arrangement is inclusive of means to bias or bypass engine exhaust gas from the engine exhaust system into the engine crankcase and chamber whereby a pressure above atmospheric pressure is set up therein for the purpose of preventing water from seeping in at the journals and through gaskets that may not be absolutely water tight. To this end a fitting 72 is welded or otherwise secured to the exhaust pipe 58, the fitting being in communication with a condenser or chamber 73 by means of a conduit or passage 74. A manually operated valve 75 or other effective means is associated with passage 74 to control the flow of exhaust gases through passage 74. The condenser chamber 73 is provided with an outlet tube or passage 77 which communicates with a fitting 78, the latter being in communication with the crank chamber and crankcase of the engine. The condenser chamber 73 is for the purpose of condensing out moisture entrained with the exhaust gases, the chamber being provided with a drain cock 80 for draining off accumulated condensate.

The fitting 78 is also in communication with a passage or tube 82 leading into the intake manifold 43 the tube 82 being provided with valve means or valved fitting 83. Thus communication may be established by way of fittings 78 and 83 and tube 82 between the crankcase chamber and the intake manifold 43.

The engine is provided with an oil filler tube 85 having its entrance normally closed and sealed by means of a cap or closure 86. The upper member 52 of the carburetor closure means is formed with a dome-like portion 88 which is connected to the oil filler tube 85 by means of a tube or passage 89. The tube 89 is provided with a control valve 90 for regulating or cutting off communication between the oil filler tube and the dome 88.

The arrangement of my invention is adapted for normal fresh air ventilation of the crankcase and crank chamber and by manipulation of valve means, the engine may operate under water in a satisfactory manner. Under normal operation of the vehicle that is, when engine is not submerged in water, the valve 75 in the exhaust system is closed while the valves 83 and 90 are in open position. Under these conditions, the carburetor is supplied with air through the tube 48, and the exhaust gases from the engine normally pass out through exhaust manifold 55, outlet 56, exhaust pipes 58 and 61, and through the openings 66 in the cylinder 65 mounted at the upper end of the exhaust tube 61, the pressure of the exhaust serving to hold the plunger or valve 68 in elevated or open position. As the valve 83 is in opened position, the atmospheric pressure in the inlet manifold 43 with which the passage 82 is in communication sets up a subatmospheric pressure condition within the crankcase of the engine. As the valve 90 is in open position, a suction or subatmospheric pressure in the crankcase also exists in the oil filler tube 85 and passage 89 leading into the carburetor closure formed by elements 45 and 52. As the latter is open to the atmosphere through the air inlet tube 48, fresh air may flow through tube 48, passage 89, oil filler tube 85, through the crankcase and crank chamber through fitting 78, passage 82 and past the valve 83 into the inlet manifold 43 to ventilate the engine crankcase and chamber with fresh air.

When it is desirable or necessary to drive the vehicle through streams or under conditions where the engine is submerged or partially submerged, the vehicle operator closes the valves 83 and 90 and opens the valve 75 in the exhaust bypass or biasing system. With the structure in this condition, the engine exhaust gases being under a certain pressure dependent upon the weight of the plunger or valve 68, portions of the exhaust gases are bypassed or biased through passage 74 into the condensing chamber 73 wherein all or a large part of the moisture in the exhaust gas condenses, the moisture free exhaust gas passing through passage 77 and fitting 78 into the crankcase of the engine. Thus while the engine is submerged, the fresh air ventilation of the crankcase does not function, but part of the exhaust gases from the engine are biased into the crankcase setting up a pressure slightly greater than that of the surrounding water. The exhaust gases in the crankcase will escape outwardly along the journals and at any other points where water might otherwise seep into the engine crankcase or crank chamber were it not for the increased pressure within the engine crankcase.

The amount of exhaust gas pressure set up is dependent upon the weight of the plunger 68 and the pressure spring 69. I have found that an exhaust back pressure of from three to seven pounds per square inch impressed in the engine crankcase gives satisfactory results without materially interfering with the functioning of the engine. This exhaust back pressure may be varied by changing the weight of plunger 68 or the expansive pressure of spring 69 or modifying both elements, whichever may be found to be most desirable.

After the vehicle has crossed a stream and is in position to be operated normally, the vehicle operator closes the exhaust bypass valve 75 and opens the valves 83 and 93 to reestablish the normal ventilating system so that fresh air ventilation of the crankcase may be resumed.

The drain cock 80 should be opened periodically to drain out the condensate that may be formed in the condensing chamber 73. It is highly desirable that the moisture be removed promptly as internal combustion engine exhaust gases contain sulphur and sulphurous compounds which readily combine with moisture to form sulphuric and sulphurous acids, which are per se very corrosive or deleterious to metal parts.

It is apparent that, within the scope of the invention, modifications and different arrangements may be made other than is herein disclosed, and the present disclosure is illustrative merely, the invention comprehending all variations thereof.

What I claim is:

1. In combination with an internal combustion engine, a conduit for conveying exhaust gases away from the engine; means for creating an increase in gas pressure above atmospheric pressure in said conduit, said means including a valve in said conduit; and means for biasing exhaust gases from said conduit into the crank chamber of the engine.

2. In combination with an internal combustion engine, a conduit for conveying exhaust gases away from the engine; valve means for maintaining an exhaust gas pressure above atmospheric pressure in said conduit, and means for diverting a portion of the exhaust gases from said conduit into the crank chamber of the engine.

3. A system for operating an internal combustion engine in submerged condition which includes setting up pressure in the engine exhaust gas conveying means and of diverting exhaust gases from the conveying means into the engine crank chamber to create and maintain pressure therein above atmospheric pressure.

4. A system for operating an internal combustion engine in submerged condition which includes setting up back pressure in the normal engine exhaust gas conveying means and of biasing exhaust gases into the engine crank chamber to raise and maintain the pressure therein above atmospheric pressure.

5. A system for operating an internal combustion engine in submerged condition which includes the biasing of exhaust gases from the normal engine exhaust conveying means into the engine crank chamber to raise and maintain the pressure therein above atmospheric pressure.

6. A system for operating an internal combustion engine under normal conditions and when the engine is in submerged condition which includes utilization of engine intake manifold subatmospheric pressure to circulate air through the engine crankcase under normal engine operation, and of means to divert exhaust gases from the engine exhaust system into the engine crankcase to set up superatmospheric pressure therein to adapt the engine for submerged operation.

7. A system for operating an internal combustion engine under normal conditions and when the engine is in submerged condition which includes utilization of engine intake manifold subatmospheric pressure to circulate air through the engine crankcase under normal engine operation, and of means to stop air circulation through the crankcase and divert exhaust gases from the engine exhaust system into the engine crankcase to set up superatmospheric exhaust gas pressure therein to adapt the engine for submerged operation.

8. In combination with an internal combustion engine having an exhaust gas disposal system, of means including a passage in communication with the engine crankcase to admit air therein; means in communication with said engine crankcase for promoting a circulation of air therethrough; means for diverting exhaust gases from said exhaust gas disposal system into the engine crankcase; and means for selectively diverting exhaust gases into the engine crankcase or promoting the circulation of fresh air therein.

9. In combination with an internal combustion engine having a carburetor and intake and exhaust manifolds; a closure surrounding the carburetor and having an air inlet passage; a passage from said closure to the crankcase of the engine; means communicating with said intake manifold for inducing the circulation of air through the engine crankcase from said housing; an exhaust pipe connected to said exhaust manifold; means for setting up a predetermined exhaust gas pressure in said pipe; means for biasing exhaust gases from said exhaust pipe into the engine crankcase; and means for selectively establishing the circulation of air through the engine crankcase or the biasing of exhaust gases into the engine crankcase.

10. In combination with an internal combustion engine having intake and exhaust manifolds; means associated with said intake manifold for inducing the circulation of air through the engine crankcase; an exhaust pipe connected to said exhaust manifold; means associated with said exhaust pipe for setting up exhaust gas pressure therein; means for biasing exhaust gases from said exhaust pipe into the engine crankcase; and means for selectively establishing the circulation of air through the engine crankcase or the biasing of exhaust gases into the engine crankcase.

11. In combination with an internal combustion engine having a carburetor and intake and exhaust manifolds; a closure surrounding the carburetor and having an air inlet passage; a passage from said closure to the crankcase of the engine; means communicating with said intake manifold for inducing the circulation of air through the engine crankcase from said housing; an exhaust pipe connected to said exhaust manifold; means associated with said exhaust pipe for setting up a predetermined exhaust gas pressure in said pipe; means for biasing exhaust gases from said exhaust pipe into the engine crankcase; said biasing means including a condensing chamber adapted to condense moisture entrained in the biased exhaust gases; and means for selectively establishing the circulation of air through the engine crankcase or the biasing of exhaust gases into the engine crankcase.

12. In combination with an internal combustion engine having an exhaust gas disposal system; means for biasing exhaust gases from said exhaust gas disposal system into the engine crankcase to set up superatmospheric exhaust gas pressure therein to adapt the engine for submerged operation; said biasing means including a condensing chamber adapted to condense moisture entrained in the biased exhaust gases.

13. In combination with an internal combustion engine having intake and exhaust manifolds; means for conveying air to the crankcase of the engine; means including a passage for establishing communication between said engine crankcase and the intake manifold whereby the atmospheric pressure in said intake manifold causes a circulation of air through said crankcase; an exhaust conduit communicating with said exhaust manifold for normally conveying exhaust gases away from the engine; means for regulating the pressure in said exhaust conduit; a passage for biasing exhaust gases from said conduit into the engine crankcase; and means for rendering ineffective the air circulation through said crankcase when exhaust gases are biased into the crankcase.

14. The combination with an internal combustion engine having a carburetor and intake and exhaust manifolds; a housing for said carburetor; an air inlet conduit for conveying air into said housing; means for conveying air from said housing to the crankcase of the engine; means including a passage for establishing communication between said engine crankcase and the intake manifold whereby the atmospheric pressure in said intake manifold causes a circulation of air from said housing through said crankcase; an exhaust conduit communicating with said exhaust manifold for normally conveying exhaust gases away from the engine; means for regulating the pressure in said exhaust conduit; a passage for biasing exhaust gases from said conduit into the engine crankcase; and means for rendering ineffective the air circulation through said crankcase when said exhaust gases are biased into the crankcase.

15. The combination with an internal combustion engine having a carburetor and intake and exhaust manifolds; a housing for said carburetor; an air inlet conduit for conveying air into said housing; means for conveying air from said housing to the crankcase of the engine; means including a passage for establishing communication between said engine crankcase and the intake manifold whereby the atmospheric pressure in said intake manifold causes a circulation of air from said housing through said crankcase; an exhaust conduit communicating with said exhaust manifold for normally conveying exhaust gases away from the engine; means for regulating the pressure in said exhaust conduit; means for biasing exhaust gases from said conduit into the engine crankcase; said biasing means including a condensing chamber adapted to condense water vapor entrained in the biased exhaust gases; and means for rendering ineffective the air circulation through said crankcase when said exhaust gases are biased into the crankcase.

16. A system for operating an internal combustion engine under normal conditions and when the engine is in submerged condition, which includes the utilization of engine intake manifold subatmospheric pressure to circulate air through the engine crankcase under normal engine operation, and of means to eliminate air circulation through the engine crankcase to adapt the engine for submerged operation.

17. In combination with an internal combustion engine having an intake manifold and a crankcase, of means including a passage in communication with the engine crankcase to admit air therein; means including a passage in communication with said crankcase and the intake manifold for promoting a circulation of air through said first mentioned passage and the crankcase; and valve means associated with said passages for eliminating the circulation of air through the crankcase.

DELMAR G. ROOS.

REFERENCES CITED

The following references are of record in the file of this patent:

UNITED STATES PATENTS

| Number | Name | Date |
| --- | --- | --- |
| 1,511,867 | Asbury | Oct. 14, 1924 |
| 1,511,868 | Asbury | Oct. 14, 1924 |
| 1,756,897 | Bilsky | Apr. 29, 1930 |
| 2,159,256 | Clarke | May 23, 1939 |

FOREIGN PATENTS

| Number | Country | Date |
| --- | --- | --- |
| 25,186 | Great Britain | Nov. 7, 1907 |